United States Patent [19]

Lysen et al.

[11] Patent Number: 6,040,903
[45] Date of Patent: Mar. 21, 2000

[54] ELECTRO-OPTICAL MEASURING DEVICE FOR DETERMINING THE RELATIVE POSITION OF TWO BODIES, OR OF TWO SURFACE AREAS OF BODIES, IN RELATION TO EACH OTHER

[75] Inventors: Heinrich Lysen, Garching; Kal Aschenbrenner, Goldach; Thomas Letze, Oberschlielssheim, all of Germany

[73] Assignee: Prüftechnik Dieter Busch AG

[21] Appl. No.: 09/142,174

[22] PCT Filed: Jan. 22, 1997

[86] PCT No.: PCT/EP97/00274

§ 371 Date: Sep. 22, 1998

§ 102(e) Date: Sep. 22, 1998

[87] PCT Pub. No.: WO98/33039

PCT Pub. Date: Jul. 30, 1998

[51] Int. Cl.$^7$ ............................ G01N 21/86; G01B 5/25
[52] U.S. Cl. ................ 356/153; 356/152.3; 356/400; 250/559.37; 33/412; 33/645
[58] Field of Search ................ 356/139.01, 399, 356/148, 375, 372, 152.2, 152.3, 153, 400; 250/206.1, 206.2, 231.13, 231.14, 231.18, 559.37; 33/286, 613, 645, 529

[56] References Cited

U.S. PATENT DOCUMENTS

| 4,586,264 | 5/1986 | Zatezalo | 33/412 |
| 4,698,491 | 10/1987 | Lysen | 356/400 |
| 4,709,485 | 12/1987 | Bowman | |
| 4,864,148 | 9/1989 | Lysen et al. | 356/152.3 |
| 5,026,998 | 6/1991 | Holzl | 356/152.3 |
| 5,077,905 | 1/1992 | Murray, Jr. | 33/412 |

FOREIGN PATENT DOCUMENTS 39 11 307  10/1990  Germany .

OTHER PUBLICATIONS

Heinz P. Bloch: Laser Optics Accurately Measure Running Shaft Alignment, Oil & Gas Journal, Bd. 88, NR. 45, Nov. 5, 1990, Oklahoma, U.S., pp. 42–45, XP000200891.

P. Eickhoff: Einrichten Mit Dem Laser, Laser–Praxis, Sep. 1993, Munchen, Germany, pp. LS89–LS90, XP000394218, see Figures 1,2.

T. Pfeifer, M. Lang, J. Thiel: Geradheitsmessgerat Mit Interner Strahllagekorrektur, TM Technisches Messen, BD. 60, NR. 5, May 1993, Munchen, Germany, pp. 192–197, XP000362411.

*Primary Examiner*—Frank G. Font
*Assistant Examiner*—Zandra V. Smith
*Attorney, Agent, or Firm*—Sixbey, Friedman, Leedom & Ferguson; David S. Safran

[57] ABSTRACT

Proposed for detecting the relative position of two bodies (2, 3) or surface regions of bodies is an electro-optical measuring instrument which has, in a known way, a light beam transmitter (4), which can be attached to the one body (3) or surface region and transmits a focused light beam (L), and a single-axis or multi-axis optoelectronic position detector with a light-sensitive measuring surface (5). During measurement of the bodies (2, 3) or surface regions, the light beam (L) impinges on the measuring surface (5), and its point of impingement (LA) moves over the light-sensitive surface (5), during execution of a measuring movement, in a way which is characteristic of the current mutual alignment of the bodies (2, 3) or surface regions. If the mutual alignment deviates substantially from a desired position, it can happen with the known measuring instruments of this type that without a correcting countermeasure the point of impingement (LA) of the light beam would leave the measuring surface (5) in the further course of the measuring movement. This is prevented in accordance with the invention by means of a device which carries out an extension of the measuring region while monitoring the measuring movement.

7 Claims, 6 Drawing Sheets

ELECTRO-OPTICAL MEASURING DEVICE FOR DETERMINING THE RELATIVE POSITION OF TWO BODIES, OR OF TWO SURFACE AREAS OF BODIES, IN RELATION TO EACH OTHER

BACKGROUND OF THE INVENTION

1. Field of the Invention

The invention relates to an electro-optical measuring instrument for detecting the relative position assumed by two bodies or two surfaces of bodies with respect to one another.

Known instruments of this type are fitted with a measuring arrangement which has at least one light beam transmitter and at least one single-axis or multi-axis optoelectronic position detector. In a path fixed with respect to one body or surface region the light beam transmitter of this measuring arrangement directs a focused light beam of small divergence, for example a laser beam, directly or via a mirror arrangement belonging to the measuring arrangement onto the light-sensitive measuring surface of the position detector, which in the case of direct irradiation from the light transmitter is located on the other body, and in the case of reflection from the mirror arrangement fastened to the other body is located on the same body as the light beam transmitter. The position detector supplies electrical signals corresponding to the coordinates of the instantaneous point of impingement of the light beam on the measuring surface, and the measuring arrangement or parts of the latter are configured such that it/they can be displaced in a defined measuring movement with the or on the one and/or other body or surface region in such a way that the geometrical locus, produced in the course of the measuring movement, of the points of impingement of the light beam on the measuring surface is in a predetermined relationship to the relative position of the bodies or surface regions to be determined. The measuring instrument can therefore calculate under programmed control the relative position to be detected, on the basis of the electric signals supplied during the measuring movement. Electro-optical measuring instruments of this known category are disclosed, inter alia, by EP 0 474 799 B1 and DE 39 11 307 A1 of the Applicant.

2. Description of Related Art

The measuring instruments of the generic type according to the abovementioned printed publications are used to detect the state of alignment of shafts, for example shafts which are to be coupled to one another and belong to two rotary machines, for example a motor and an electric generator driven thereby, so that positional corrections can be undertaken in the event of a deviation from the ideal state of alignment which exceeds a predetermined permissible size, before, for example, the shaft bearings and/or the shaft coupling suffer damage caused by the defective alignment.

If the alignment error is very large, it can happen when working with the known measuring instruments that the laser beam impinges on the measuring surface of the position detector, which surface has a prescribed size, only over subregions of the measuring movement. So far, it has been the approach in such cases initially to undertake, more or less by eye and on the basis of the incompletely obtained measuring signals, one or more preliminary corrections of the relative position of the shafts until the existing alignment error has been reduced to a measure at which the point of impingement of the light beam has remained on the measuring surface of the position detector in the course of the subsequent measuring movements beyond the complete measuring movement in each case, thus rendering it possible to undertake exact corrections purposefully from then on.

Comparable situations can also arise in the case of other measuring instruments of the generic type which are used, for example, to measure the shape of a surface to be measured with respect to a plane defined by the light beam or laser beam.

SUMMARY OF THE INVENTION

It is the object of the invention to create a measuring instrument of the known category mentioned at the beginning which permits detection of the beginning and the end of a required extension of the measuring region, that is to say displacement of the detector measuring surface and of the light beam with respect to one another, in such a way that the point of impingement of the light beam remains on the measuring surface of the position detector over a subsequent part of the measuring movement, without active intervention of the user at the measuring instrument (for example pressing a key), and to guide the user through this extension.

The above object is achieved by a device which carries out an extension of the measuring region while monitoring the measuring movement.

In the case of the measuring instrument according to the invention, it is assumed that when observing the measuring movement the measured variables available provide the possibility of obtaining the criteria for distinguishing between the actual measuring operation and the extension of the measuring region.

The invention is explained in more detail below by recourse to exemplary embodiments with the aid of the drawings.

DETAILED DESCRIPTION OF THE INVENTION

Figure 8:
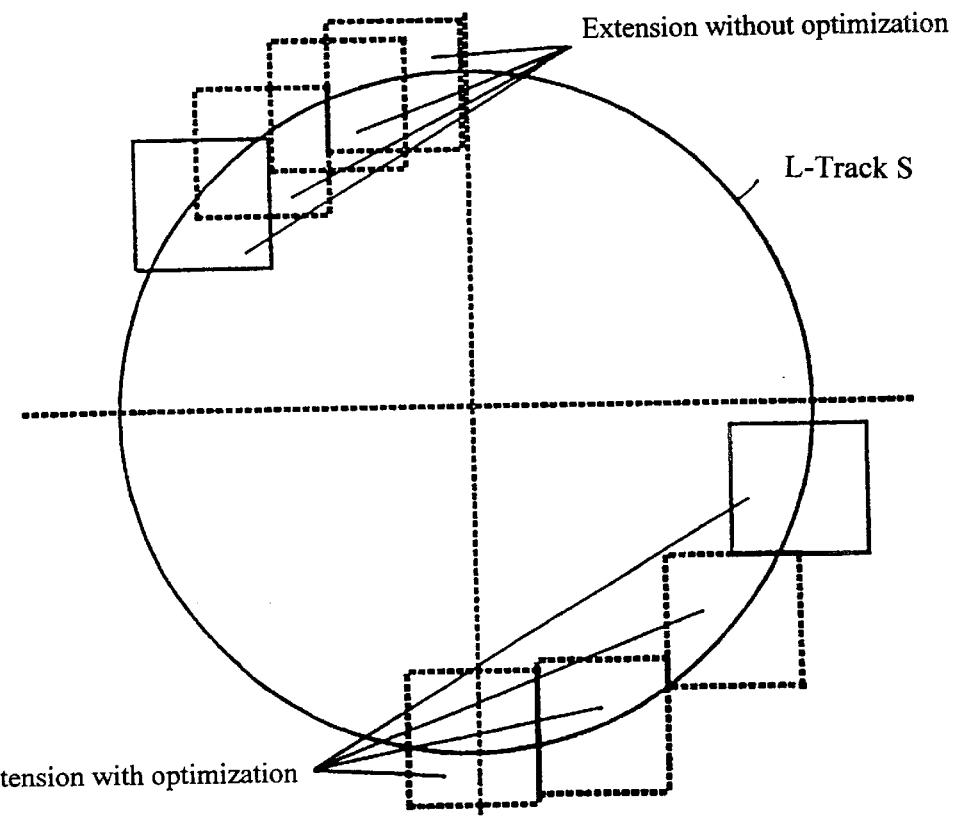
FIG. 8 shows, in a diagrammatic representation with the direction of view parallel to the laser beam, the laser path and the positions resulting after carrying out extensions in the course of the measuring movement, of the measuring surface of the detector, top left in FIG. 8 for extension without optimization, and bottom right in FIG. 8 in the case of extension with optimization.
Figure 9:
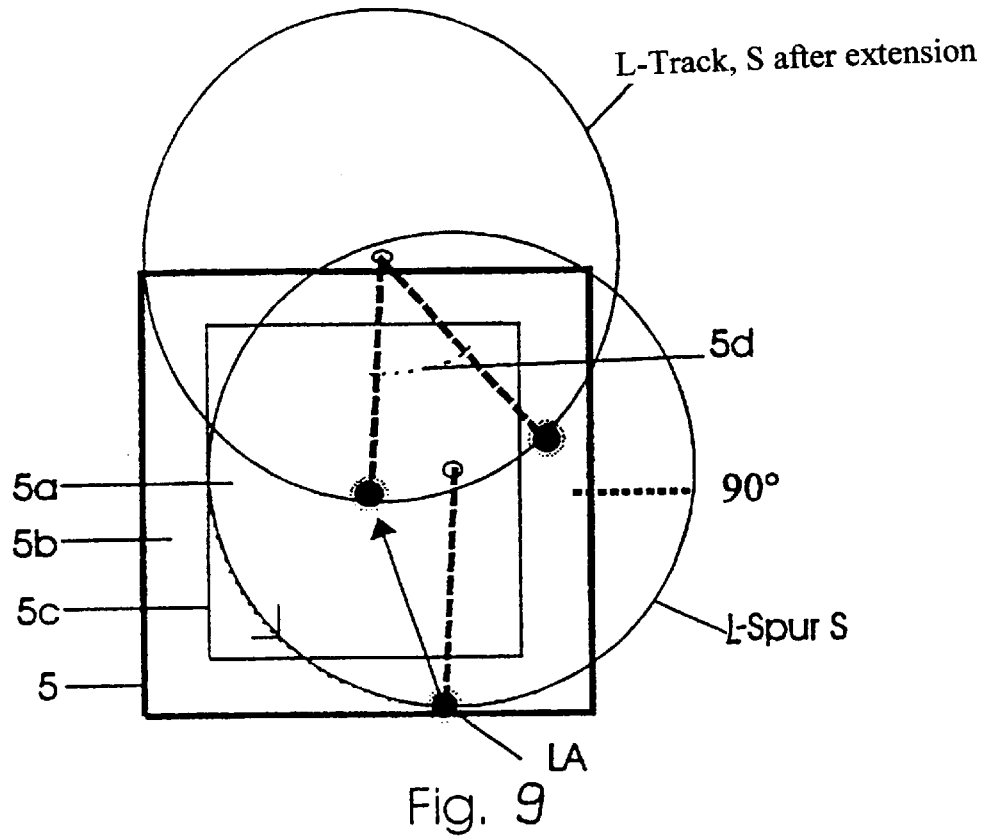
FIG. 9 shows, in a diagrammatic representation, the measuring surface of the position detector, the laser path and the track of the point of impingement of the light beam on the measuring surface before and after normal extension by displacing the laser beam from its prior position into a new position with respect to the measuring surface of the position detector.
Figure 10:
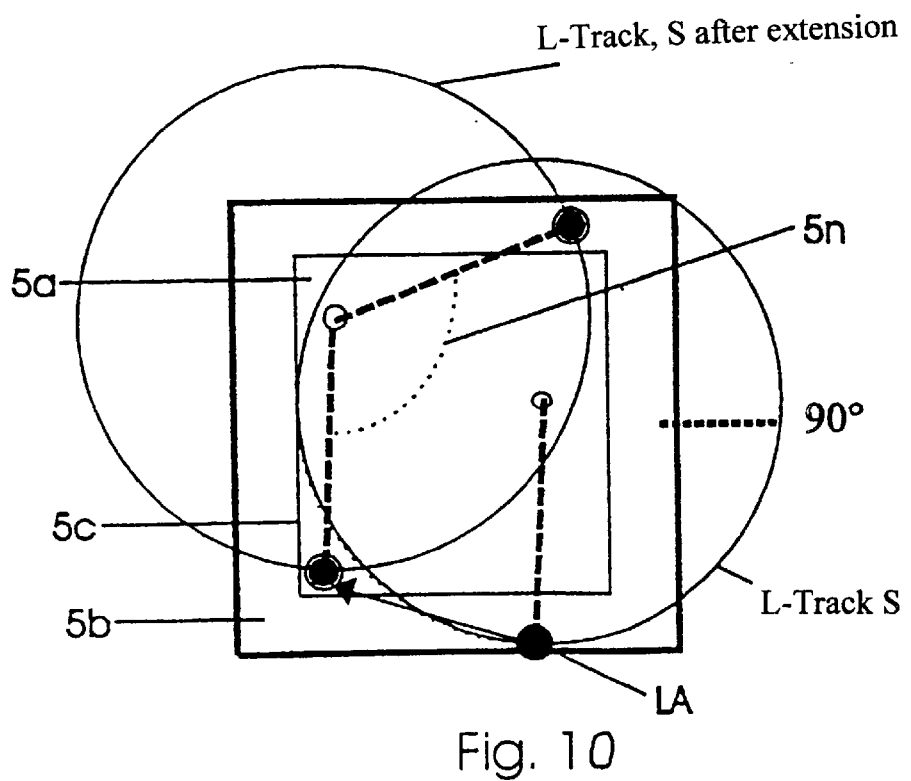
FIG. 10 shows, in a diagrammatic representation, the measuring surface of the position detector, the laser path and the track of the point of impingement of the light beam on the measuring surface before and after an optimized extension by displacing the laser beam from its prior position into a new position with respect to the measuring surface of the position detector.

The measuring instrument according to the invention is described below with reference to its use in aligning shafts (FIG. 1 to FIG. 8) and to its use in measuring the height profile of a surface (FIGS. 9 and 10). Various other applications going beyond these applications are also conceivable to the person skilled in the art.

In the application on which FIGS. 1 to 8 are based, two shafts 2 and 3 to be coupled to one another by a bipartite coupling 1a, 1b are measured with respect to their state of alignment by means of the measuring instrument.

Figure 1:
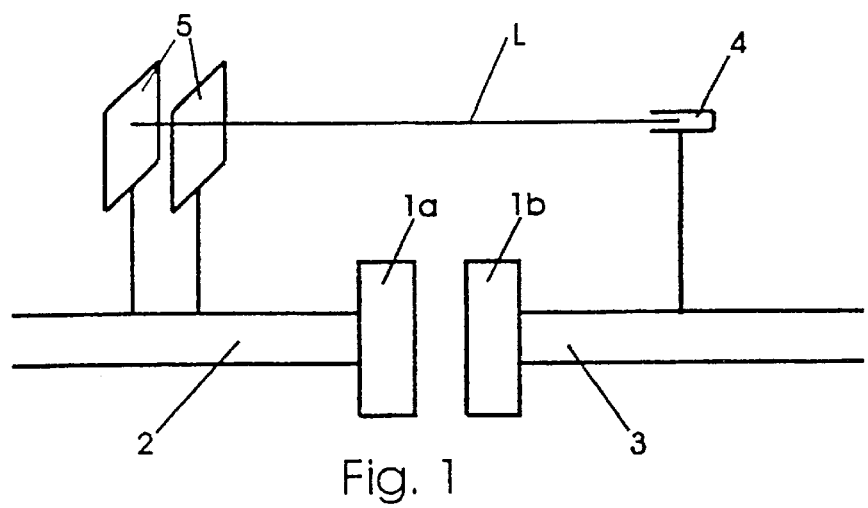
FIG. 1 to FIG. 3 show three known embodiments of measuring instruments in use for detecting the state of alignment of two shafts which are to be coupled to one another and are arranged one behind another, diagrammatically in each case in a side view.
Figure 2:
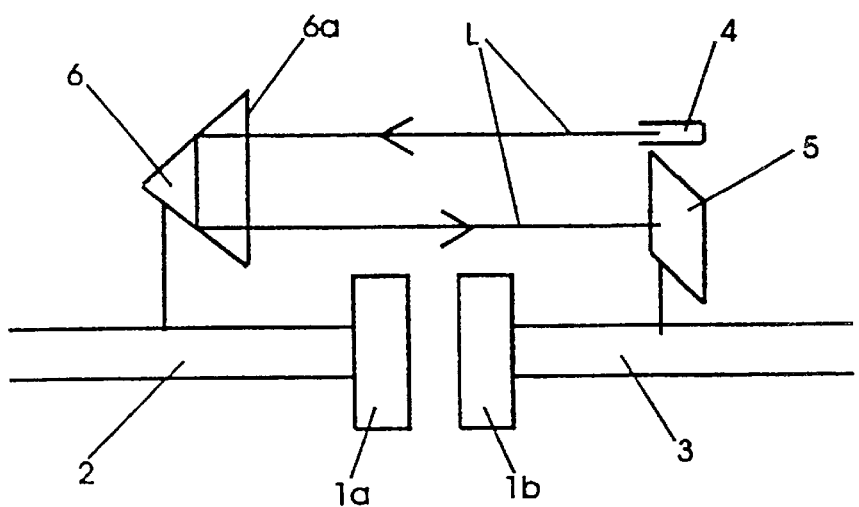
Figure 3:
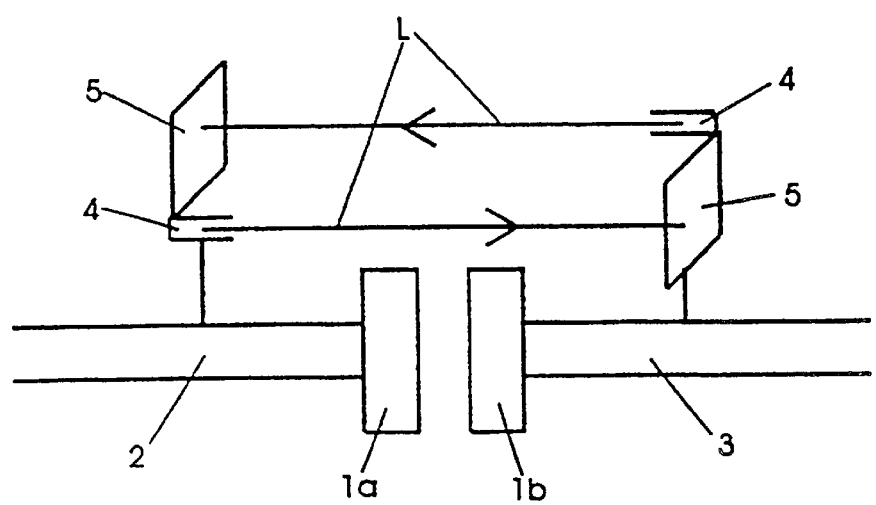

In all three embodiments in accordance with FIG. 1 to FIG. 3, the measuring instrument has at least one laser beam transmitter 4 which transmits a focused laser beam L of very small divergence in a fashion approximately parallel to the central axis of the shaft to which it is fastened, that is to say parallel to the shaft 3. Furthermore, in all the embodiments in accordance with FIGS. 1 to 3 the measuring instrument has for each laser beam L at least one electro-optical position detector whose light-sensitive measuring surface 5 is aligned essentially perpendicular to the laser beam L to be received.

In the embodiment according to FIG. 1, two electro-optical position detectors are provided which are arranged at least virtually one behind another at a certain spacing, the laser beam being incident both on the measuring surface 5 of the one detector and on the measuring surface 5 of the other detector.

In order to detect the state of alignment, the two shafts 2 and 3 are rotated in the same direction or—with stationary shafts 2 and 3—the laser beam transmitter 1 and the position detectors 5 are rotated about the shafts 2, 3 in the same direction in a coaxial fashion, in the case of the presence of a parallel offset and angular offset between the central axes of the shafts 2 and 3 the point of impingement LA of the laser beam L on the one or the other detector measuring surface 5 describing a circular track in each case on the two detector surfaces in the course of this rotary movement of the measuring instrument.

In the embodiment according to FIG. 2, only a single laser beam transmitter 4 and a single electro-optical position detector with a detector surface 5 are present, which are both fastened to the shaft 3, and a right-angled reflecting roof prism is attached to the other shaft 2 such that its hypotenuse plane 6a is essentially perpendicular to the incident laser beam L, and the incident laser beam is reflected to the position detector on the other shaft 3. In the case of a parallel offset and angular offset between the central axes of the shafts 2 and 3, the point of penetration of the laser beam through the plane containing the measuring surface 5 here describes a self-closed track which, depending on the size of the two types of offset, can be an ellipse, a circle or also—in the case of exact alignment—a point.

In the embodiment according to FIG. 3, a light beam transmitter 4 and a position detector with a measuring surface 5 are respectively permanently attached to each of the two shafts 2 and 3 to be measured with regard to their state of alignment, with the detector surface 5 being intended for receiving the laser beam L transmitted by the laser beam transmitter 4 onto the other shaft.

Figure 4:
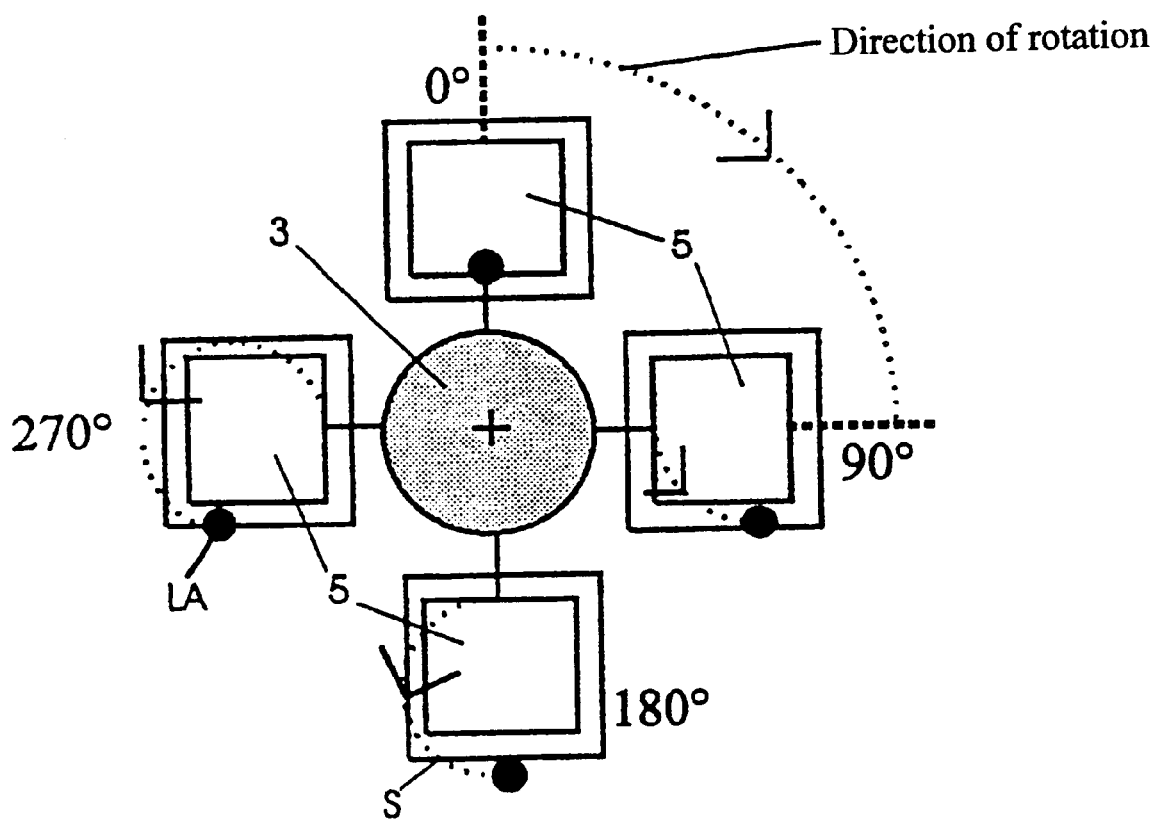
FIG. 4 shows, in a diagrammatic presentation with the direction of view parallel to the laser beam, the measuring surface of the position detector, fastened to one shaft in a prescribed relative position to said shaft, in angular positions which differ from one another by 90° in each case and which the measuring surface runs through in the course of the measuring movement, and the track which the point of penetration of the laser beam through the plane containing the measuring surface of the position detector describes in the case of a complete measuring movement resulting from rotation of the shaft by 270°, when the misalignment of the shafts is so large that the point of penetration of the laser beam leaves the measuring surface of the position detector remaining in its original relative position with respect to the shaft.

FIG. 4 shows as an example one of the position detector measuring surfaces 5 in four different angular positions, which have an angular spacing of 90° and through which said measuring surface passes in the course of a measuring movement consisting of rotation of the two shafts 2 and 3 by 270°, there also being illustrated the track S which is covered in this plane by the point of penetration LA of the laser beam L through the plane containing the measuring surface 5. It is assumed in this case that the deviation from the ideal state of alignment of the two shafts 2 and 3 is so large that the point of impingement LA of the laser beam runs out of the measuring surface 5, as is to be seen in the case of the 180° position and in the case of the 270° position, when no changes are undertaken in the setting of the measuring surface 5 with respect to the shaft 3.

Figure 5:
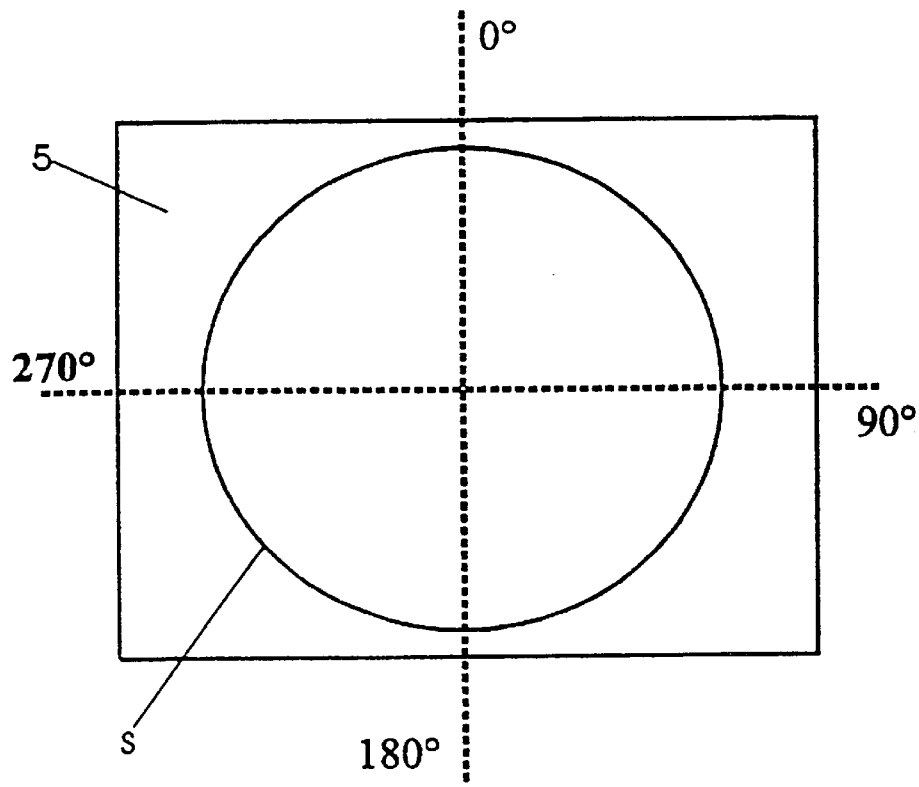
FIG. 5 shows, in a diagrammatic representation with the direction of view parallel to the laser beam, the measuring surface of the position detector, fastened to one shaft in a prescribed relative position to said shaft, and the track which the point of impingement of the light beam on the measuring surface describes when the misalignment of the shafts is so small that in the course of the complete measuring movement said point does not leave the measuring surface of the position detector remaining in its original relative position with respect to the shaft.

Only when the angular offset and the parallel offset do not exceed a specific size does the track S, which the point of impingement LA of the light beam describes with the relative position between the shaft 3 and measuring surface 5 remaining unchanged in the plane thereof, remain limited to the measuring surface 5, as is represented in FIG. 5.

In order nevertheless to ensure precise detection of the measured values in the case of alignment errors which are larger in contrast therewith, it is provided in accordance with the invention to extend the measuring region of the respective measuring detector by appropriately changing the relative position between position detector and shaft in the course of the measuring movement, doing so in each case such that the point of impingement LA of the light beam remains on the measuring surface 5 beyond the entire measuring movement, the start and the end of the extension being indicated without the intervention of the operator, and the aim being for the latter to be provided with operational guidance for changing the relative position appropriately, possibly doing so by hand.

Figure 6:
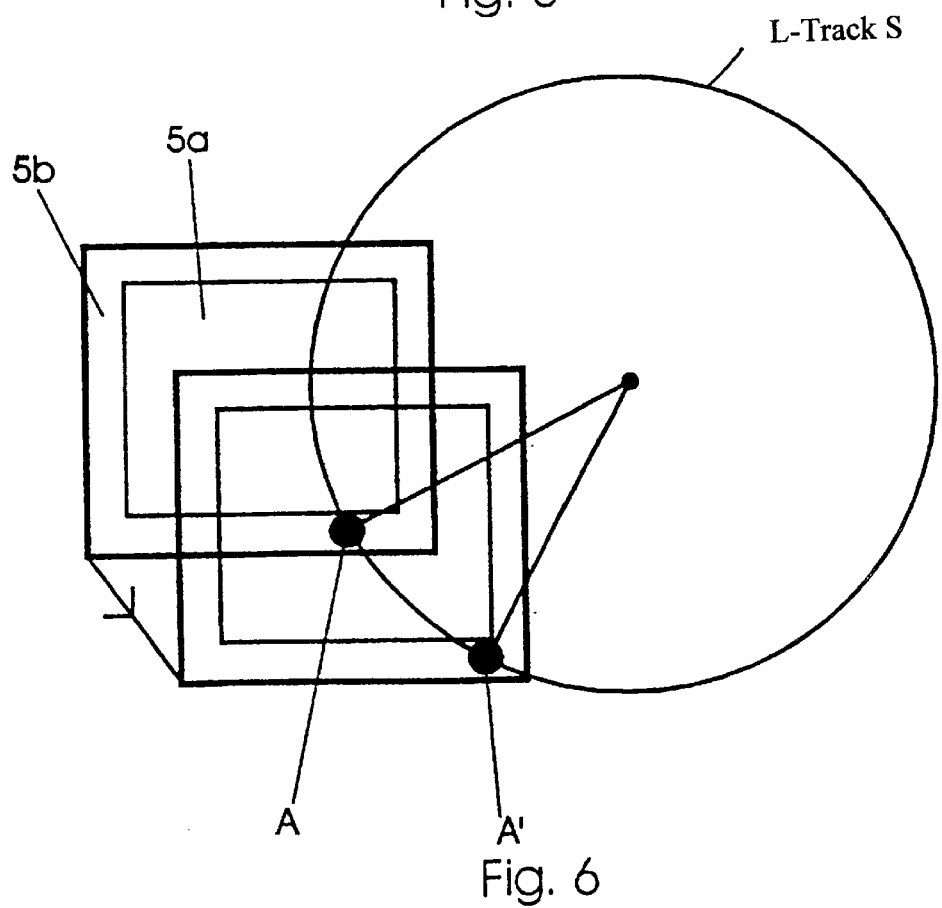
FIG. 6 shows, in a diagrammatic representation, the measuring surface of the position detector, the laser path and the track of the point of impingement of the light beam on the measuring surface before and after a normal extension by displacing the position detector with respect to the shaft.
Figure 7:
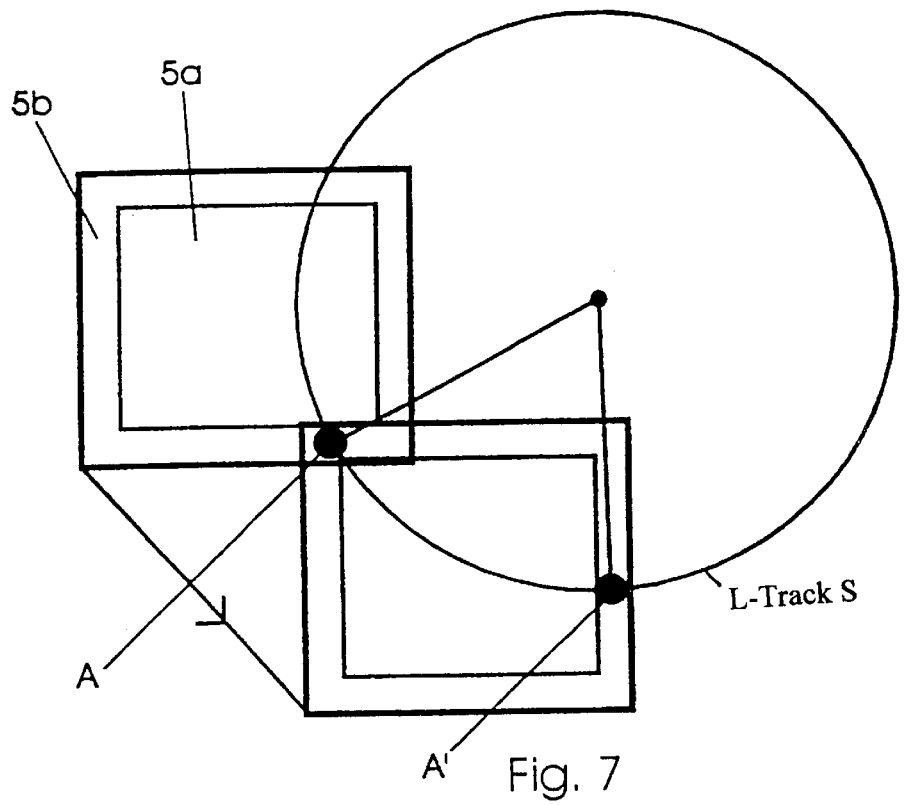
FIG. 7 shows, in a diagrammatic representation, the measuring surface of the position detector, the laser path and the track of the point of impingement of the light beam on the measuring surface before and after an optimized extension by displacing the position detector with respect to the shaft.

FIG. 6 and FIG. 7 show the principle of such an extension diagrammatically, specifically FIG. 6 doing so for a normal extension, in the case of which at the start of the extension the position detector is adjusted with respect to the shaft in a downward fashion and to the right of the viewer of FIG. 6 in such a way that the point of impingement LA of the light beam comes to be positioned again in the center of the measuring surface 5, and FIG. 7 doing so for an optimized extension, in the case of which at the start of the extension the position detector is adjusted with respect to the shaft in a downward fashion and to the right of the viewer of FIG. 7 in such a way that at the start of the extension the point of impingement LA of the light beam reaches a point on the measuring surface 5 starting from which the point of impingement of the light beam covers a maximum possible path, which can be calculated in advance, up to the next required extension (at LA') on the detector surface 5.

It may be seen from FIG. 8 that in the course of the measuring movement with optimized extensions in accordance with FIG. 7, fewer changes in position need to be undertaken between the position detector and shaft than in the case of undertaking normal extensions in accordance with FIG. 6.

The exemplary embodiments represented in FIGS. 8 and 9 differ from those reproduced in FIGS. 6 and 7 in that instead of a displacement, to be undertaken at the start of an extension, of the position detector 5 with respect to the shaft 3, at the start of an extension, the orientation of the laser beam L with respect to the position detector 5, whose position remains unchanged with respect to the shaft 3, is varied such that the starting positions, aimed at in the case of the exemplary embodiments according to FIGS. 6 and 7, of the points of impingement of the light beam on the measuring surface 5 of the position detector are maintained at the start of the extension.

It is also possible to combine the exemplary embodiments in accordance with FIGS. 6 and 7, on the one hand, and the exemplary embodiments in accordance with FIGS. 8 and 9, on the other hand.

In order to be able correctly to detect the start of an extension and correctly to detect the end of an extension, that is to say the necessity to institute the next extension of the measuring region, the detector measuring surface 5 is subdivided into two regions 5a and 5b, which can be detected, for example, from the size of the electric signals emitted by the position detector, with a boundary 5c situated there between, as is represented diagrammatically in FIGS. 6 and 7. As soon as the point of impingement LA of the light beam comes into the outer region 5b, this is used as a sign that a new extension of the measuring region must be instituted.

The measurement setup and the physically possible movements of the measurement object yield a mathematical function F which is of a known form and principle and depends on several variables which depend, in part, on spatial dimensions of the instrument and of the bodies to be measured with respect to one another, and are characterized in part by the electric signals supplied by the detector. This prescribes that a change in the parameters must always be performed in common such that this function can be satisfied. The principle according to the invention of the automatic extension of a measuring region is based on the fact that a detected deviation of coordinates from the common function F cannot be produced by scanning the measurement object or the movement of the measurement object, but rather must be caused by a change in the position of the measuring instrument or of parts thereof with respect to the bodies to be measured, that is to say by an extension of the region, and the measuring instrument is capable, with its built-in program controller, of distinguishing between such deviations of the coordinates from the common function F and changes within the function F which are inherent in the measuring system.

The points of penetration of the laser beam through the plane containing the measuring plane 5 of the position detector describe in said plane during a measuring movement, that is to say a rotation of the shafts by a predetermined angle range, a path which follows an ellipse and is determined by the form of the mathematical function which must be produced by the arrangement of the measurement setup and the possible movement of the shafts during the measuring movement. The coordinates of the detector and the angle of rotation of the entire measurement setup are available for automatically detecting whether displacement of the point of impingement of the light beam is to be ascribed to the measuring operation as such or to a change in the position of the measurement setup with respect to the measurement object. The positional coordinates of the detector can change on the basis of a measurement only if the coordinates of the point of impingement LA of the light beam on the detector surface and the angle of rotation of the detector surface remain within the predetermined function F. Otherwise, there is an extension of the measuring region.

The mode of operation of the measuring instrument according to the invention is based on the fact that a recording of new measuring points which are relevant to the calculation of the mutual displacement of the central axes of the shafts 2 and 3 must be bound up with the change in the angle of rotation, while it is true to say concerning changes in the electric signals, emitted by the detector, without a simultaneous change in the measured angle of rotation that changes are undertaken in the position of the measurement setup or of parts thereof with respect to the measurement object, that is to say an extension is carried out. This condition is used in the case of the measuring instrument according to the invention in order to detect the start of an extension. The completed extension is automatically detected of the fact that further changes in the signals emitted by the position detector are once again bound up with changes in the measured angle of rotation. This is the condition for resumption of measurement for the measuring instrument according to the invention.

After the resumption of measurement, measuring points are recorded until the point of impingement LA of the laser beam runs out of the inner zone 5a of the measuring surface 5 of the position detector, and thus an extension of the measuring region must take place to continue the measurement. The shape of the, for example, elliptical path of the point of penetration of the laser through the plane containing the measuring surface 5 of the position detector is determined from the points assembled so far. For this purpose, only a few points suffice in general for a more or less rough preliminary determination, specifically precisely as many as required by the respective system of equations of the ellipse. The ellipse which can be determined therefrom already corresponds rather precisely to the later actual movement path. Measurement methods are known by which it is possible by means of a measuring movement over an only relatively small range of rotation to determine alignment errors between the shafts with a very high accuracy.

If the path of the laser on the detector is determined, the next step is to determine the measurement setup with respect to the instantaneous point of impingement of the laser in such a way that the further course of the path will extend as far as possible on the available detector surface.

FIG. 4 shows the known case in which a measuring movement is carried out over 270° and during this process measuring signals are emitted by the position detector in angular positions which have a mutual angular spacing of 90°, which measuring signals are then evaluated under programmed control to detect the alignment errors. It is assumed in FIG. 4 that the instantaneous alignment error of the shafts 2 and 3 with respect to one another is so large as to produce in the plane of the measuring surface 5 an elliptical path whose radius is greater than half the side length of the detector. Without extension of the measuring region, it is possible in such a case to detect measuring points only over a relatively small angle of rotation of the shafts 2 and 3. In order to be able to undertake exact measurements in four measuring positions which have a mutual angular spacing of 90°, or to have available for measurements an angular region as large as possible in which unique measurement is possible, it is necessary in this case to institute an extension of the region. FIG. 6 shows the procedure in the case of a simple extension of the region, in which the position of the detector surface with respect to the laser beam is changed for the start of the extension of the region such that the laser beam once again impinges on the measuring surface 5 in the middle. In the case of this change in position, the point of impingement LA of the laser beam L draws a path on the detector, with the result that the detector also supplies electric signals which change correspondingly. This change in signal is, however, not bound up with any change in the measuring movement which is monitored. If the shafts 2 and 3 are now rotated further again in order to continue the measurement, it can happen that the point of impingement of the light beam once again passes into the outer region 5b of the detector measuring surface. In this case, the point of impingement LA of the laser beam draws on the measuring surface 5a a track in the shape of a circular arc over a relatively small angle 5d which is approximately 40°, after which the new extension of the region is to be carried out.

FIG. 7 shows extension of the region with optimization. Here, as well, the point of impingement LA of the light beam has come into the outer measuring surface region 5b at the start of the institution of the extension of the region. Now, however, the first step for the optimized extension is to calculate the path which the point of penetration of the laser through the plane containing the measuring surface will cover in the course of the further measuring movement. In the example, the path has a next maximum in the 90° direction, and the value is somewhat smaller than the side length of the detector. The point therefore has to be displaced inwards by the absolute value of the difference between the instantaneous value and the maximum from the outer edge of the inner region at 90°, that is to say to the left in FIG. 7. The result for the 0° direction is a maximum after a distance which is greater than the side length of the inner region 5a in this direction. It follows from this that the point of impingement LA of the laser must be positioned on the lower end, that is to say in the 180° direction, at the edge of the inner region 5a of the measuring surface 5 so that the point of impingement LA of the laser remains on the measuring surface 5 over a distance of optimal length in the course of the further measuring movement.

Under the guidance of an operator, the extensions of the measuring region can be undertaken manually by the user on a display added to the measuring instrument either by displacing the position detector or by changing the path of the laser beam with respect to the measurement object. In both cases, the changes in coordinates which come to light in the measuring signals and take place without continuation of the measuring movement are stored and, in the case of further points, incorporated into the calculation carried out by the instrument under programmed control.

When varying the position of the measuring surface with respect to the measurement object for the purpose of setting the new optimum position of the point of impingement LA of the laser on the measuring surface 5, the user can be assisted by optical or acoustic means. In optical terms, there can, for example, be shown on the display the new target coordinates which he has to take bearings on, or the new point is defined as 0.0, after which the user has to take bearings on 0.0. This can also be achieved by the representation of a target cross with a point of impingement on the display surface. Another possibility consists in indicating the nearness to the optimum point, for example as a bar or arrow which becomes larger or smaller. Also possible is a color change in a pixel in the display as a function of the nearness of the target point.

In acoustic terms, the frequency or the loudness level of a signal or the shape of a pulse sequence can be linked to the nearness of the target point. A voice output is also conceivable.

The measuring principle outlined above is also suitable, for example, for measuring individual points on the surface MO of a body, that is to say for setting up a height profile. In principle, the same statements apply to this as were made with regard to the extension of the region in conjunction with the exemplary embodiments of the shaft measurement outlined above.

Figure 11:
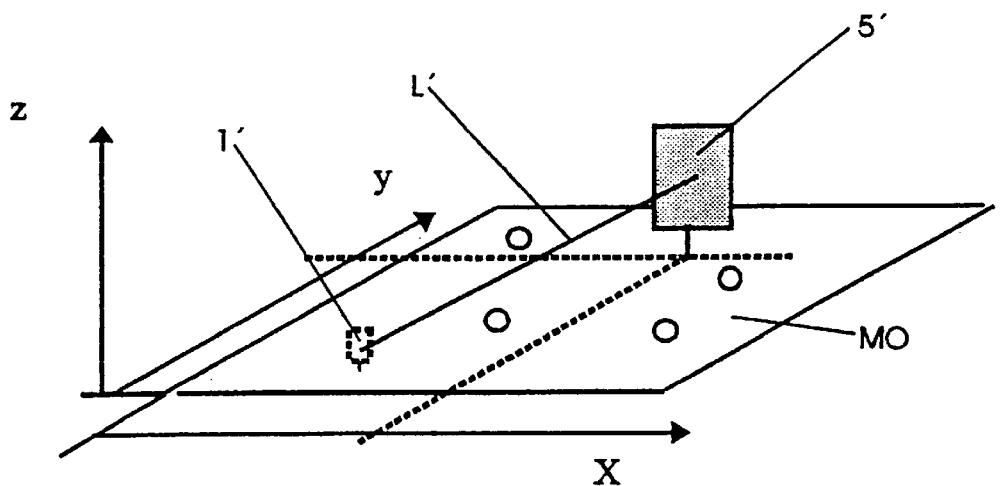
FIG. 11 shows, in a diagrammatic, perspective representation, the measurement of the height profile of a surface, using a laser beam and position detector.
Figure 12:
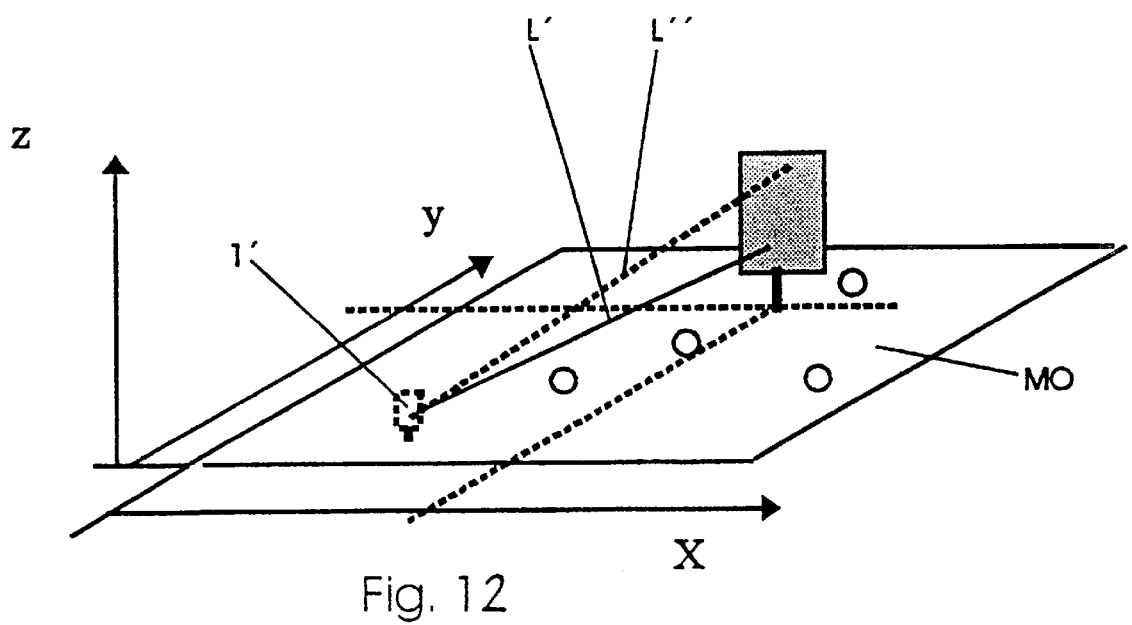
FIG. 12 shows the measurement in accordance with FIG. 8 by carrying out an extension of the measuring region.

The laser beam transmitter 1' in accordance with FIGS. 11 and 12 is mounted statically and transmits a light beam L' via the measurement object, the surface MO of the body. The part of the measuring instrument receiving the laser beam L' has its foot F placed onto the points to be measured, and the coordinates of the detector are recorded (FIG. 11).

If the part receiving the laser beam L' has been installed with its measuring surface 5', a change in the measured variable decisive for the height to be measured can come about only if there is a simultaneous change in the coordinates X and Y of the measuring position of the detector containing the measuring surface 5'.

Since the measuring instruments of the type visible from FIG. 11 and FIG. 12 can detect not the measured variables X, Y but, rather, the height Z to be determined for the point of impingement LA' of the laser beam on the detector measuring surface 5', it may be said that if the user does not input any new X- and Y-coordinates, but if there is a change in the Z-coordinate on the detector measuring surface 5', an action is being carried out at the measurement setup. An extension is being instituted. The execution of this extension is now detected when new X- and Y-positional coordinates are input by the user. In this way, the measuring region has been extended without the user having been compelled to give an explicit start or stop command on the measuring system.

The positional coordinates X and Y count here as measurement variables which in this case permit detection of the change in the measurement setup. If said coordinates remain constant during a change in the height coordinate Z, an extension of the measuring region can be assumed (FIGS. 11 and 12).

In the exemplary embodiment in accordance with FIGS. 11 and 12, the extension is undertaken by varying the angle at which the laser beam L' is transmitted by the transmitter 1'. Of course, it would also be possible in principle to vary the length of the foot F supporting the measuring surface 5'.

We claim:

1. Electro-optical measuring instrument for detecting the relative position assumed by at least surface regions of two bodies with respect to one another, having a measuring arrangement which has at least one light beam transmitter and at least one optoelectronic position detector with a light-sensitive measuring surfaces wherein:

a) the light beam transmitter is arranged in a path fixed with respect to at least the surface region at least one of the two bodies in a manner for directing a focused light beam of small divergence onto the light-sensitive measuring surface of the position detector, and the position detector supplying electric signals corresponding to coordinates of the instantaneous point of impingement of the light beam on the measuring surface in response to impingement of said light beam thereon, and b) at least parts of the measuring arrangement are configured to be displaceable in a defined measuring movement with the surface region of one of the two bodies in such a way that a geometrical locus, produced in the course of the measuring movement, of the points of impingement of the light beam on the measuring surface is in a predetermined relationship to the relative position of the at least surface regions of the two bodies to be determined, the measuring instrument having means for calculating, under programmed control, the relative position to be detected on the basis of the electric signals as supplied by the position detector during the measuring movement and further comprising a device which carries an extension of the measuring region while monitoring the measuring movement.

2. Electro-optical measuring instrument according to claim 1, further comprising a program controller set up such that the measuring instrument automatically treats changes in the position of the point of impingement of the light beam on the measuring surface, which take place without simultaneous measuring movement, as a displacement undertaken to extend the measuring region of the light beam with respect to the measuring surface of the position detector instead of as measuring signals.

3. Electro-optical measuring instrument according to claim 1, further comprising a device for generating a warning signal perceptible to the user when, in the course of the measuring movement, the point of impingement of the light beam has come within a predetermined distance of an edge of the measuring region.

4. Electro-optical measuring instrument according to claim 2, further comprising a device which indicates at which starting point on the measuring surface the point of impingement of the light beam is to be moved by changing the mutual position of the light beam and detector measuring surface for a following measuring region as soon as the point of impingement of the light beam a preceding measuring region has reached a still permissible end position at a boundary of the measuring surface and would run out of the measuring surface in the event of continuation of the measuring movement for detecting the state of alignment of two shafts arranged one behind another in an essentially coaxial fashion in which the measuring movement comprises rotation of the shafts about longitudinal axes thereof synchronously with pivoting of at least parts of the measuring arrangement mounted thereon about the stationary shafts in a fashion coaxial with their central axes.

5. Electro-optical measuring instrument according to claim 4, further comprising means for calculating a starting point such that an optimum length is available on the measuring surface for the geometrical locus of the points of impingement of the light beam to be expected in the following measuring region.

6. Electro-optical measuring instrument according to claim 4, wherein the program controller is configured such that the geometrical locus, produced during a rotation of the shafts by 360°, of the points of impingement of the light beam can be calculated approximately from the geometrical locus, produced during a substantially smaller angle of rotation, of the points of impingement of the light beam.

7. Electro-optical measuring instrument according to claim 1 wherein for measuring the surface of a body, the light beam transmitter transmits a light beam extending as a reference beam on the surface, and the position detector with its measuring surface being fastened, for the purpose of measuring a distance of points on the surface from the reference beam, to a sensing element which is displaceable along the surface, and wherein a device is provided which detects whether, before each distance measured, for a measuring point on the surface, the spatial coordinates of this measuring point with respect to a spatially fixed reference point have been input into the measuring instrument, and wherein changes in the position of the point of impingement of the light beam on the measuring surface are automatically treated by the measuring instrument as an extension of the measuring region when this change is not accompanied by a preceding input of spatial coordinates.

* * * * *